(12) United States Patent
Freeburg (10) Patent No.: US 8,315,167 B2
(45) Date of Patent: Nov. 20, 2012

(54) MULTIPLEXING OF DS1 TRAFFIC ACROSS WIRED AND WIRELESS ETHERNET DEVICES

(76) Inventor: Thomas Freeburg, Neenah, WI (US)

( * ) Notice: Subject to any disclaimer, the term of this patent is extended or adjusted under 35 U.S.C. 154(b) by 682 days.

(21) Appl. No.: 11/778,727

(22) Filed: Jul. 17, 2007

(65) Prior Publication Data

US 2008/0019272 A1    Jan. 24, 2008

Related U.S. Application Data

(60) Provisional application No. 60/807,664, filed on Jul. 18, 2006.

(51) Int. Cl.
*G01R 31/08* (2006.01)

(52) U.S. Cl. .................. 370/232; 370/516

(58) Field of Classification Search .......... 375/93.01, 375/93.15, 93.31, 93.37
See application file for complete search history.

(56) References Cited

U.S. PATENT DOCUMENTS

| | | | |
|---|---|---|---|
| 5,477,541 A | 12/1995 | White et al. | |
| 5,663,962 A * | 9/1997 | Caire et al. | 370/535 |
| 5,940,479 A * | 8/1999 | Guy et al. | 379/93.01 |
| 6,108,314 A * | 8/2000 | Jones et al. | 370/294 |
| 6,157,955 A | 12/2000 | Narad et al. | |
| 7,020,791 B1 | 3/2006 | Aweya et al. | |
| 7,304,962 B1 | 12/2007 | Kirla et al. | |
| 2005/0005020 A1 | 1/2005 | Rey et al. | |
| 2006/0013208 A1* | 1/2006 | Rietschel et al. | 370/389 |
| 2006/0146884 A1 | 7/2006 | Skerritt | |
| 2006/0153179 A1 | 7/2006 | Ho et al. | |
| 2006/0221983 A1* | 10/2006 | Cavgalar et al. | 370/401 |
| 2008/0019272 A1 | 1/2008 | Freeburg | |
| 2008/0044182 A1 | 2/2008 | Frank et al. | |

FOREIGN PATENT DOCUMENTS

| | | |
|---|---|---|
| CA | 2657617 A1 | 1/2008 |
| DE | 102 57 679 A1 | 7/2004 |
| EP | 1 450 514 A1 | 8/2004 |
| EP | 1450514 A1 * | 8/2004 |
| EP | 1819114 A2 | 8/2007 |

OTHER PUBLICATIONS

PCT/US2007/073678, International Search Report mailed Jan. 2, 2008.
European Search Report in related EP Application No. EP 07 10 2343, mailed Jan. 2, 2008.
Office Action in related Canadian Application No. 2,657,617 mailed May 24, 2012, pp. 1-4.

* cited by examiner

*Primary Examiner* — Phuc Tran
*Assistant Examiner* — Kouroush Mohebbi
(74) *Attorney, Agent, or Firm* — Banner & Witcoff, Ltd.

(57) ABSTRACT

Apparatuses and methods for multiplexing of DS1 traffic across wired and wireless Ethernet devices. A transmitter sends data packets to a receiver through an Ethernet system. The transmitter includes a modeling module that constructs a modeled jitter buffer corresponding to a receiver jitter buffer located at the receiver. The transmitter also includes a packetizing buffer that collects data to form data packets, that inserts buffer pointers into the data packets, and that sends the data packets through the Ethernet system. A buffer pointer is determined from the modeled jitter buffer. The receiver includes an Ethernet interface module that obtains the data packets from the Ethernet system, a jitter buffer, and a depacketizer that reads a buffer pointer in the data packet and that places the data packet into a position within the receiver jitter buffer in accordance with the buffer pointer.

21 Claims, 8 Drawing Sheets

| Line Rate | | Packet Size | Packetizing Delay, ms |
|---|---|---|---|
| 1,544,000 | T1 | 1024 | 5.31 |
| 2,048,000 | E1 | 1024 | 4.00 |
| 1,544,000 | T1 | 724 | 3.75 |

FIG. 1

| TDM Payload Bytes | Overhead Bytes | Link Speed Mbps | Delay ms | |
|---|---|---|---|---|
| 1024 | 66 | 10 | 0.872 | |
| 724 | 66 | 10 | 0.632 | Recommended for T1 |
| 960 | 66 | 10 | 0.8208 | Recommended for E1 |
| 1024 | 66 | 100 | 0.872 | |
| 724 | 66 | 100 | 0.0632 | |
| 960 | 66 | 100 | 0.08208 | |

FIG. 2

| Equipment Type | Average Protocol Delay in ms |
|---|---|
| Backhaul 20 | 3.75 |
| Backhaul 20 | 3.75 |
| Advantage Multipoint Downstream | 3.75 |
| Advantage Multipoint Upstream | 5.5 |
| Orthogon 60 | ? |
| Orthogon 300 | ? |

|  | Avg. Packets | Bytes | ms | Avg Packets | Bytes | ms |
|---|---|---|---|---|---|---|
| Processing Delay |  |  | 0.01 |  |  | 0.01 |
| Packetizing Delay |  | 730 | 3.78 |  | 960 | 3.75 |
| Ethernet Delay |  | 730 | 0.64 |  | 960 | 0.82 |
| Ethernet Device Delay |  |  | 3.75 |  |  | 3.75 |
| Propagation Delay |  |  | 0.10 |  |  | 0.10 |
| Ethernet Delay |  | 730 | 0.64 |  | 960 | 0.82 |
| Buffer | 4 | 5110 | 15.13 | 3 | 4800 | 11.35 |
| Processing Delay |  |  | 0.01 |  |  | 0.01 |
| Overall Delay |  |  | 24.06 |  |  | 20.61 |

MULTIPLEXING OF DS1 TRAFFIC ACROSS WIRED AND WIRELESS ETHERNET DEVICES

This application claims priority to provisional U.S. Application Ser. No. 60/807,664 ("Multiplexing of DS1 Traffic Across a Wired and Wireless Ethernet Devices"), filed Jul. 18, 2006.

FIELD OF THE INVENTION

The invention relates multiplexing DS1 traffic over Ethernet facilities.

BACKGROUND OF THE INVENTION

Communications systems have traditionally supported voice services separately from data services. However, voice signals are typically represented in a digital format, such as with a time division multiplexed (TDM) signal. Moreover, packet-switched data transmission is increasingly replacing circuit-switched data transmission, in which communications paths are no longer fixed but typically vary in time. Consequently, in order to efficiently utilize a packet data network, there is a market need to support both TDM signals and other types of digital signals by a packet data network.

SUMMARY

The present invention supports multiplexing of DS1 (E1 and T1) traffic across wired and wireless Ethernet devices and is associated with a family of devices known as Time Division Multiplex over Internet Protocol (TDMoIP). With an aspect of the invention, LAN traffic is multiplexed along with the T1/E1 payload. The LAN traffic is managed to utilize only the available bandwidth in the connection to avoid interfering with the TDM traffic.

With another aspect of the invention, a transmitter sends data packets to a receiver through an Ethernet system. The transmitter includes a clock recovery module that recovers inherent clocking information from a signal obtained from the Ethernet system, a modeling module that constructs a modeled jitter buffer corresponding to the receiver, and a packetizing buffer that collects data to form data packets, that inserts buffer pointers into the data packets, and that sends the data packets through the Ethernet system. A buffer pointer is determined from the modeled jitter buffer. The packetizing buffer may also repeat a data bit that is contained in a data packet in another data packet in order to support forward error correction.

With another aspect of the invention, a receiver receives data packets from a transmitter through an Ethernet system. The receiver includes an Ethernet interface module that obtains the data packets from the Ethernet system, a jitter buffer, and a depacketizer that reads a buffer pointer in the data packet and that places the data packet into a position of the jitter buffer in accordance with the buffer pointer. The buffer pointer is indicative of a modeled jitter.

This Summary is provided to introduce a selection of concepts in a simplified form that are further described below in the Detailed Description. This Summary is not intended to identify key features or essential features of the clamed subject matter, nor is it intended to be used as an aid in determining the scope of the claimed subject matter.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

Aspects of the present invention relate to distinguishing the script type of at least one portion of a writing input.

Overview

In accordance with an embodiment of the invention, a transmission system uses a unique algorithm to transport the multiplexed data streams. An algorithm is optimized for wireless Ethernet transport. Because of the potential for changing conditions that may affect wireless network throughput, the transmission system provides the capability for recovering from data loss, without propagating the errors to following frames.

A transmission system utility user interface allows the creation and management of "Interface Profiles" that contain all the management parameters necessary for optimum operation with each of a wide variety of broadband wireless links. Profiles for each of these units are made available for inclusion in the transmission system setup process.

Because the transmission system provides physical pass-through of the DS1 link, no special configuration or setup is required regardless of the format (e.g., fractional, channelized, clear channel, checksum on or off, etc.). The T1 & E1 signals are precisely repeated. No special setup is needed to enable such things as fractional T1; whatever is impressed upon the T1 connection at one end appears unchanged at the other.

With an embodiment of the invention, a transmission architecture enables the transmission system's hardware to be interactive, reprogrammable and reshapable—with scalability and greater dimensionality. The transmission system may be advantageous to competitive technologies that have built-in obsolescence and delivers a far greater value than silicon-based circuitry.

The transmission system may be deployed across a networked environment using wireless broadband, wired Ethernet, or a combination. A channel look-ahead capability continuously estimates the variation of arrival time in conjunction with a programmable channel optimization capability. Consequently, the transmission system may deliver optimum reliability under changing network conditions. For example, when used with a wireless system, the transmission system provides "last mile" T1 & E1 transport across distances limited only by the selected radio's capabilities. It is an ideal, affordable solution for connecting PBX systems in remote office and campus environments. The transmission system may also supplant wire-line T1 & E1 connections to cellular towers, eliminating monthly leased landline charges as well as the associated problems.

Packetizing Machine at the Transmitting End

Figure 7:
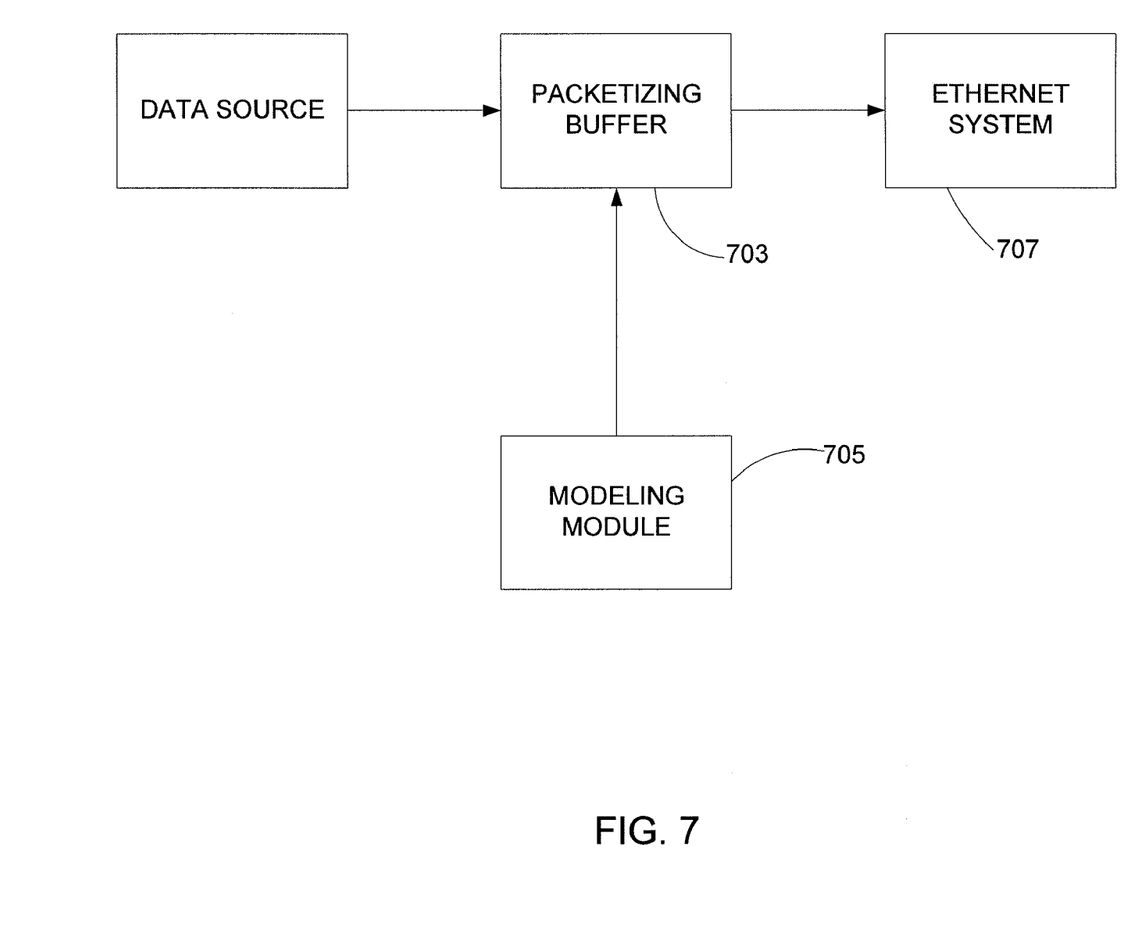
FIG. 7 shows a block diagram of a transmitter that is supported by an embodiment of the invention.

In accordance with an embodiment of the invention, the 'transmitting' transmission system receives bits over the DS1 line via a Line Interface Unit (LIU) 701 that recovers the inherent clock from that bit stream. If the transmission system in question is configured in Mode 2 ('sync from DS1 bit stream'), that clock is used for processing the DS1 data. If, however, the transmission system in question is configured in Mode 1 ("the transmission system supplies DS1 clock") or in Mode 3 ("the transmission system uses clock from other end"), the transmission system's internal clock is supplied to the connected DS1 equipment for it to use in presenting the data to the transmission system interface. Of course, in the case of Mode 3, that internal clock is carefully synchronized with the clock at the far end; that mechanism is discussed in detail in a later section.

The bits from the LIU 701 are sent into a packetizing buffer 703, where they are collected until there are enough to make a full packet of 'DS1 packet size' bytes. Subsequently, a packet header is prepended, the buffer pointers (as will be discussed), the line indicator, and the appropriate checksums are added, and the packet is formed and presented to the Ethernet system for transmission.

The transmitter keeps a model 705 of the jitter buffer at the receiving end, and computes where in that buffer each packet is to go. The buffer pointer is included in the DS1 header portion of each DS1 packet, so that the receiver can read it. Each packet begins just after the last byte of the previous packet, except in the case where Forward Error Correction (FEC) is enabled. In that case, each packet begins at the midpoint of the preceding one, so that two copies of each bit in the DS1 data are actually transmitted; in other words, the information is each DS1 packet is duplicated, ½ in the preceding packet and ½ in the following.

Note that this method of calculating pointers makes the DS1 system independent of changes in packet order. Further, with FEC enabled, the loss or extreme delay of any one packet out of 3 sequential ones makes no difference to the system. This makes the transmission system much less sensitive to channel errors and to widely varying channel delays, allowing for much smaller delays, at the cost of a greater data throughput requirement.

Figure 8:
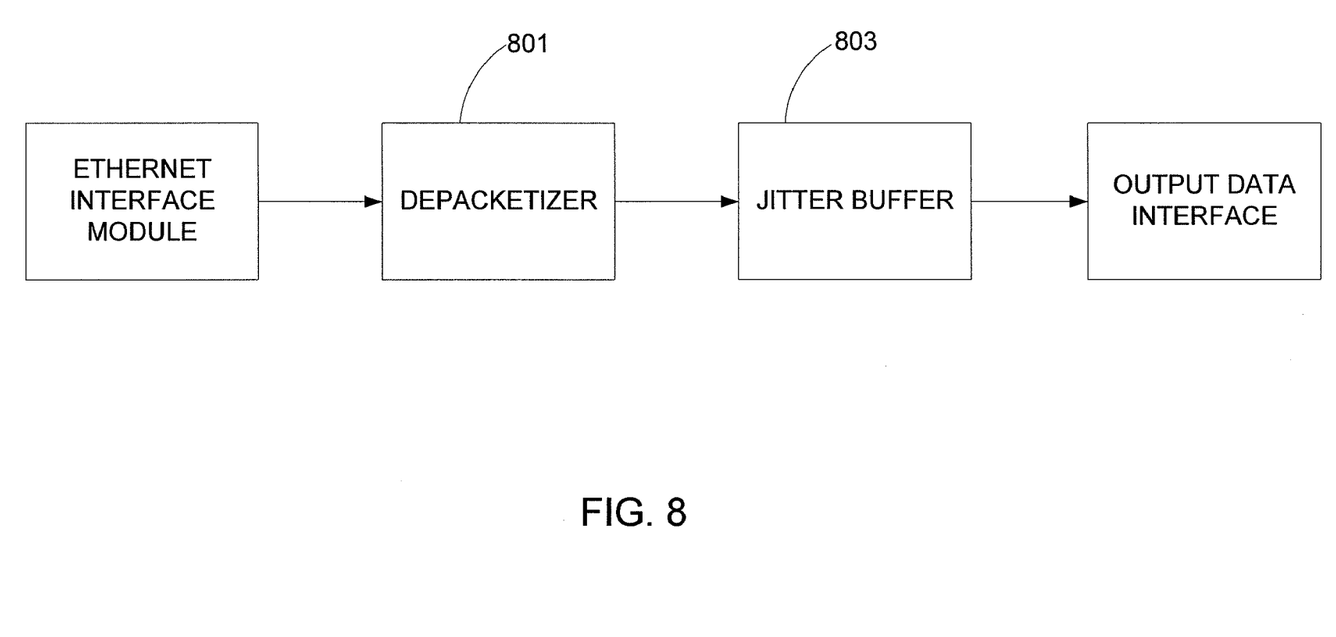
FIG. 8 shows a block diagram of a receiver that is supported by an embodiment of the invention.

The Ethernet channel 707 delivers packets containing DS1 data to the receiving transmission system. At the receiver, the depacketizer 801 verifies the packet header, reads the buffer pointer, and places the packet into the jitter buffer 803 beginning at the place specified in the pointer contained in the received packet.

There are three additional key registers in the receiver, as follows:

the 'jitter buffer size'
the 'read pointer', which tells the DS1 output system where to get the next byte to be converted to DS1, and
the 'level counter', which indicates how many bytes of data have been received since system reset. This last counter is only valid during the startup sequence, from reset until DS1 data starts flowing out of the transmission system.

The startup sequence is:
1. The receiver system is put into reset;
2. The first packet is received from the Ethernet interface;
3. The 'read pointer' is set to the pointer address in that packet and frozen at that point;
4. The bytes in the packet are put into the jitter buffer starting at the address contained in the packet, and the 'level counter' is incremented as the bytes are put into the buffer;
5. When the last byte in the packet has been put into the buffer, a check is made to see if the 'level counter' exceeds ½ of the 'buffer size'; if it does not, the receiver keeps the 'read pointer' frozen at its initial state (as in step 3), and returns to step 4 for the next packet.
6. When the check at the end of a packet results in the 'level counter' being equal to or greater than ½ the 'jitter buffer size', the 'read pointer' is freed and the DS1 output is turned on.

The above procedure results in an integer number of packets in the buffer at the start of the DS1 output. When FEC is enabled, the 'level counter' is only incremented once for each 2 bytes received.

Clock Recovery

The clock used to send bits out the DS1 interface (from the transmission system to the connected telecommunications equipment) comes from one of 4 choices:

Mode 1. The transmission system's internal clock is used as the reference.
Mode 2. The clock recovered from the DS1 line and used in the packetizing sequence is also used to transmit the bits that the transmission system receivers from the other end of the system (from its partner transmission system). In this way, the transmission system that is located at the timing source point presents consistent information to the DS1 system.
Mode 3. In this mode, the transmission system synchronizes its clock to the clock in use at the transmitting end, by using a sophisticated digital filtering process and information gained from the level of the jitter buffer.
Mode 4. In Mode 4, the transmission system uses information from an (external) out-of-band (that is, not part of the Ethernet link between the transmission system pair) signaling path, such as a GPS receiver at each end, or the Ethernet device's frame timing mechanism.

In Mode 3, the transmission system incorporates a series of unique mechanisms. First, as each TDM packet is received, the instantaneous level of the jitter buffer is recorded. Then, that measurement is inspected to see if is lies within the 'expected', or 'normal', range for the Ethernet path in use. If it is outside the 'expected' range, that is, if it's an 'outlier', it is not used in the timing calculation. Otherwise, its value is added to an averaging register.

When a large enough sample of such timing information has been collected to satisfy the next-stage filtering algorithm, the 'sample estimator' so collected is passed on the oscillator adjustment routing.

This scheme delivers an estimate of the 'most probable' buffer level, not simply the average, and therefore makes the system insensitive to a percentage of packets that take much longer arrive, so that delays such as congestion or radio errors do not cause significant variations in the recovered clock rate.

In Mode 4, the transmitting transmission system at the DS1 timing source (the transmission system that is in Mode 1 or Mode 2) counts the number of DS1 bits that it receives between timing pulses from the external circuitry (such as GPS), and sends the result in a unique packet to the receiving transmission system at the other end. As an alternative to GPS, the transmission system can generate a 1-second pulse from the DS1 data, and supply it (via the power cable) to an Ethernet device configured as Timing Master.

The receiving transmission system (which is typically equipped with a high stability clock option) uses the timing pulse (either from another GPS receiver, or from a timing slave Ethernet device) and the bit count mentioned above to precisely set the oscillator it uses for sending bits to the DS1 line.

Delay Computations

The one-way packet delay consists of 4 components, as follows:

The inherent processing delay in the transmission system—the time it takes for the transmission system logic;

The packetizing delay—time it takes to assemble a full packet of DS1 data on the transmitting end;

The link delay—the time it takes to transmit the packet from one transmission system unit to the other over the WAN link; and The buffering delay—the (unfortunately necessary) time allowance for variations in the WAN link.

The inherent processing delay of the transmission system is less than 10 microseconds; this is insignificant when compared to the other elements in a typical system using a wireless broadband link for the WAN connection Packetizing delay is the time it takes to assemble one packet. It is found by the formula:

$$D_{packet} = \frac{N_{bytes\_per\_packet} \cdot 8}{D_{DS1\_bits\_per\_second}} \quad \text{(EQ. 1)}$$

Figure 1:
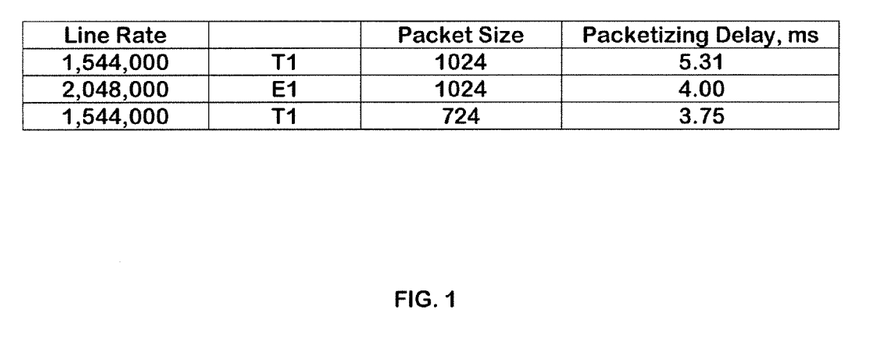
FIG. 1 shows packetizing delays for various packet sizes in accordance with an embodiment of the invention.

Packet Delay=Bytes per packet*8/DS1 bits per second. Some typical sizes are shown in FIG. 1.

The link delay is of course dependent on the wireless link chosen for the WAN path. It has 3 sub-components: the delay on the Ethernet wire on the ends (twice, of course, once for each end), the 'in the air' delay, or propagation time, and the delay for the wireless protocol.

Figure 2:
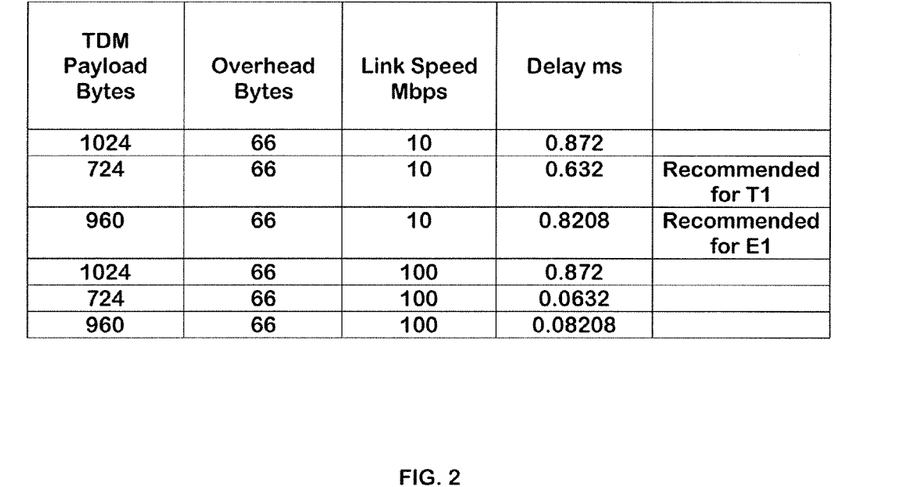
FIG. 2 shows wire delays for various packet sizes in accordance with an embodiment of the invention.

The wire delay is the sum of the TCP/IP overhead bits and the DS1 payload bits, all divided by the line rate. Typical values are shown in FIG. 2.

The propagation time due to the speed of light—about 5.5 microseconds per mile of path length, or 3.4 microseconds per kilometer. For a typical of path of say 10 miles or 16 Km, this delay is 55 microseconds; a negligible value when compared to the other system delays.

Figure 3:
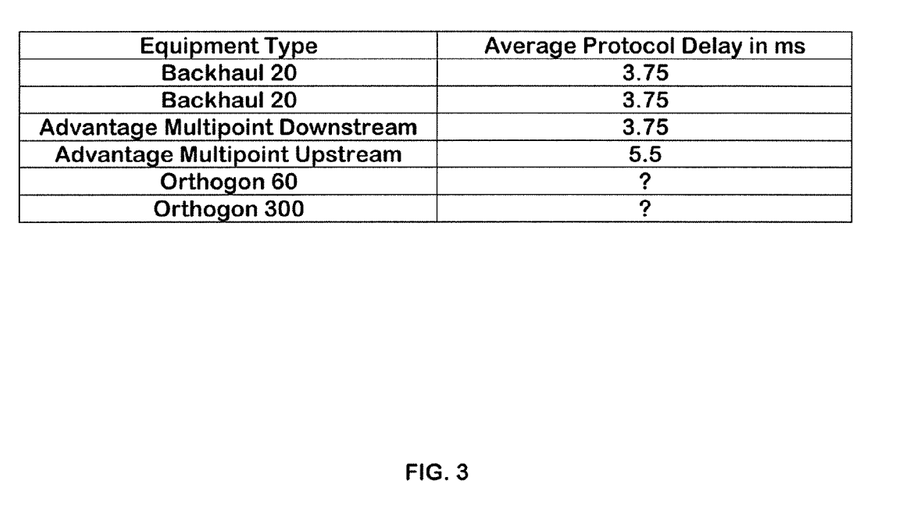
FIG. 3 shows average protocol delays for various equipment types in accordance with an embodiment of the invention.

The protocol delay must really be separated into two more components—the average delay, and the delay variation. In fact, it is this delay variation that we must consider most carefully when the final calculations made—that of buffering delay (commonly called jitter buffering, but properly de-jitter buffering). First and simplest, the average protocol delay is usually well understood by the manufacturer of the wireless equipment. Some typical values are shown in FIG. 3.

Delay Variation is the most complex item to evaluate in a TDOoIP network. In a wireless network in particular, there is a substantial coupling between delay variation and link reliability; the way the link responds to transmission impairments has a large effect on delay, and characteristic of that effect depends on the error mitigation strategy implemented on the link. There are basically 3 strategies in common use today, as follows:

Fragmentation and reassembly, with Automatic Repeat-reQuest (ARQ) covering each of the fragments. This may be implemented with or without Forward Error Correcting (FEC) coding on the fragments.

Internal Repeat of the entire packet, again with or without FEC. In this case, the wireless equipment itself repeats the packet if it is not received correctly.

Reliance on the retry mechanism of TCP/IP, usually with FEC on the packet. In this case, the (on the order of seconds) retry mechanism of IP is relied upon to provide any link reliability improvement over that of the raw radio channel, although the use of FEC (as in WiFi and WiMax) can make that fairly good.

In order to make the problem of evaluating any particular link more tractable, the transmission system includes a special tool for measuring the statistics of the link delay variation. During normal operation, the transmission system in Mode 3 or 4 takes a sample of the instantaneous link delay every 100 ms, and compiles a histogram. This histogram is available at the console port via an RS-232 or TelNet connection to a PC, and is used by the transmission system itself in making clock synchronization decisions. The date in the next section was taken with the aid of this tool.

Figure 4:
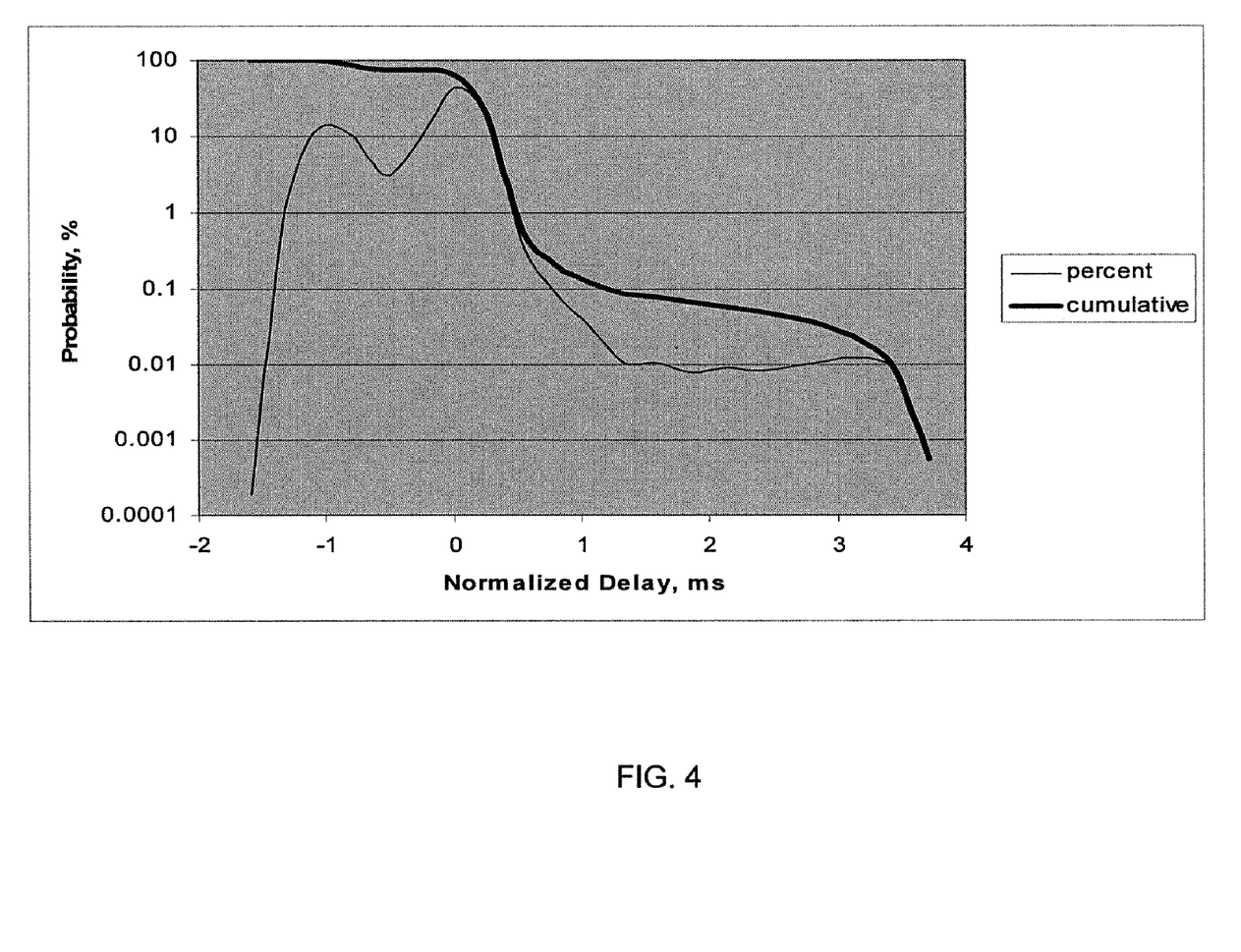
FIG. 4 shows a delay histogram that is supported by an embodiment of the invention.

For purposes of illustration, one examines type 1 Ethernet systems in accordance with am embodiment of the invention. FIG. 4 shows a histogram of measured values on an actual Ethernet link (backhaul, 10 Mbps). Note the 'average' delay of 3.75 ms, and the fairly slow dropoff as times get longer—out to 0.001% probability at about 7.5 ms (a total delay variation from the average of 7.50−3.75=3.25 ms. This is, in fact, considered a "good" link.

With an exemplary embodiment of the invention, a fragment that arrives at the receiver with errors is retransmitted 1 or 2 frames later (frames are 2.5 ms), so that the impact of an error on one of the (64 byte) fragments is to delay the entire Ethernet packet by an additional 2.5 or 5 ms. Of course, very occasionally, the retransmission may itself be lost, causing yet another 2.5 or 5 ms of delay.

In addition, there is a uniformly-distributed delay due to the framing. This delay varies (with a constant incremental probability) from 0.2 ms to 2.7 ms, giving an average value of about 1.5 ms. It is these two values taken together that make the 'average' 3.75 ms mentioned earlier.

Figure 5:
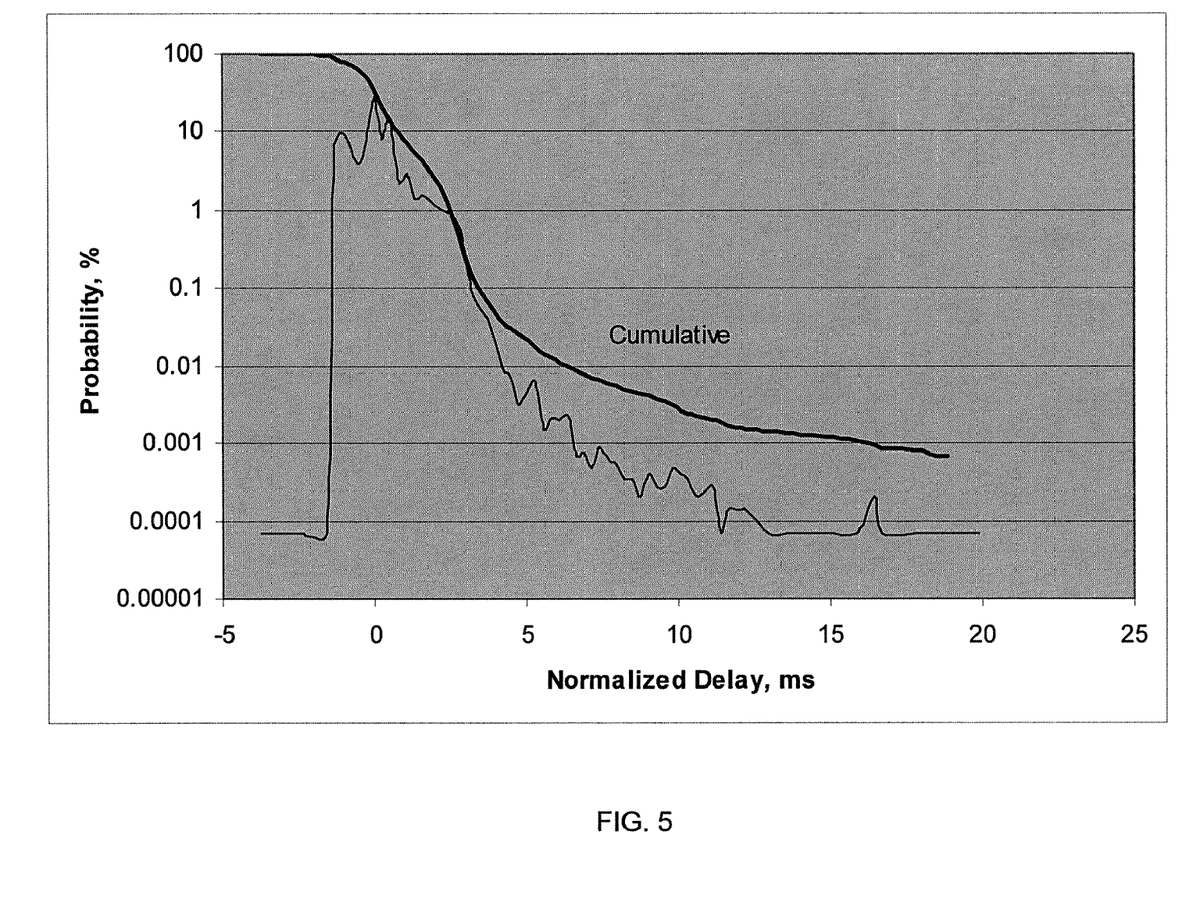
FIG. 5 shows a delay histogram that is supported by an embodiment of the invention.

FIG. 5 shows a histogram for a link in a poorer situation with respect to the histogram shown in FIG. 4. In this case, delays extend out to over 23 ms, and one suspects that there in fact some significant number of packets that are lost. One may examine the impact on a DS1 link. The average packet rate is on the order of 200 packets per second (pps); a rate of 0.001% (20 ms on this chart) is therefore an event rate one packet in 1 million, or about one packet exceeding this delay every 1⅓ hours—17 errored seconds per day, as long as the delay causes only a packet's worth of bit errors.

This is where one of the features of the transmission system comes into play—the buffer pointer to each piece of data is actually embedded in the transmitted packet, so if a packet is not received in time, the receiver still keeps sending processed information. It will of course send error bits as long as the proper packet doesn't arrive, but it won't lose clock information, and as soon as the new packet does arrive the proper information will be extracted and sent.

Forward Error Correction

If FEC is activated, each bit is sent in two different packets. The probability of two packets in sequence being delayed or lost is much lower than in the normal case.

Figure 6:
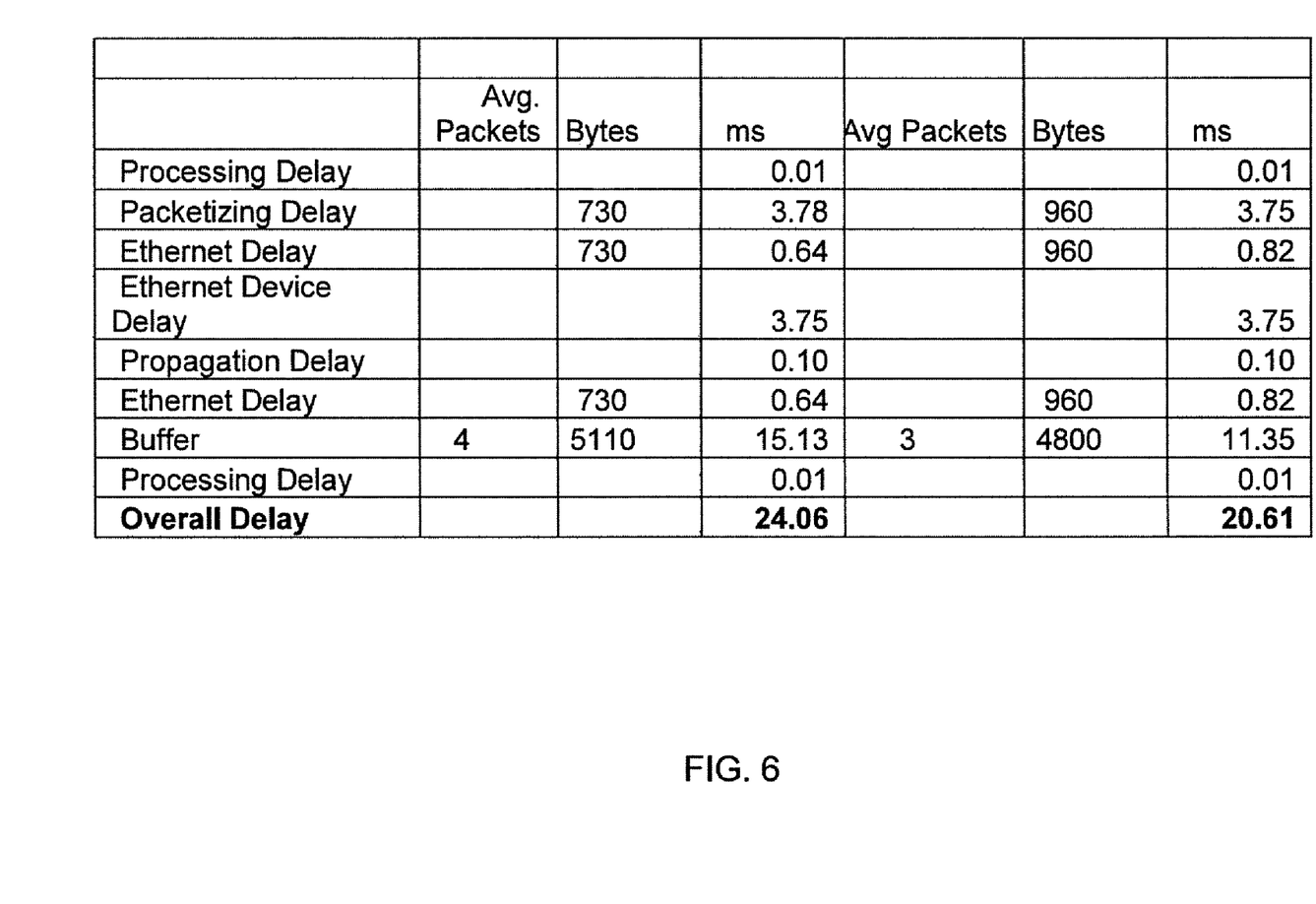
FIG. 6 shows an overall delay that is supported by an embodiment of the invention.

FIG. 6 shows typical overall delays for a backhaul link that is supported by an embodiment of the invention.

Design Considerations in Accordance with an Embodiment of the Invention

One design consideration is the transmission of Time-Division Multiplex (TDM) data over Internet Protocol (IP) links and is commonly referred as TDM over IP (TDMoIP). In accordance with an embodiment of the invention, one design consideration is to keep the TDM clock at the far-end in accurate synchronization with the near-end (near to the TDM source, usually the telephone network or switch). Consequently, the IP network is commonly configured to provide high priority to special packets known as timing packets.

Another consideration is the transmitting of the TDM data over wireless broadband links with IP at the ends and some other protocol over the radio portion of the communications path having a Time-Division-Duplex (TDD) format. In such a case, the delivery-time variation caused by the TDD mechanism may substantially exceed the required timing accuracy required.

One approach to the above problem is to synchronize the TDD frame to the TDM data. For example, a timing mechanism enables the radio at one end (the "timing master") to synchronize its TDD frame to an incoming pulse at a 1-second rate; consequently, the TDM to IP converter only needs to generate the pulse from the incoming TDM data. Once this is done, the system need only compensate for "normal" IP variations, which may become large enough to reintroduce the TDD frame variations into the equations.

With an aspect of the invention, each radio sends, from its wired IP port to the TDM to IP converter, a short IP packet at high priority at the exact start of each TDD frame. The TDMoIP converters at both ends of the communications path consequently know exactly the start of each IP frame. Since the radios have a mechanism to keep the two ends of the link in essentially exact synchronization, the radios have a common timing reference. However, the timing reference may exhibit the generic stability of whatever timebase the radios are equipped with. This deficiency may be overcome by an ordinary PLL within the TDMoIP converter to provide an always-current numeric relationship between the TDD frame and the TDM stream timing.

In the case where the radio sends timing packets, it is not necessary that one packet be sent per TDD frame. If one packet is sent per a fixed multiple of frames (e.g., one packet per 400 frames corresponding to once per second), the same timing information may be derived. In a similar fashion, in the case where the TDMoIP converter originates the packets, one burst (not one packet) could be sent once per N frames.

Furthermore, the TDMoIP converter can deduce whether the radio (to which it is connected) is in receiver mode by noting that it is receiving packets from the radio, which under certain circumstances of radio channel and Ethernet loading, may be directly related with the TDD frame timing.

With an aspect of the invention, in the cases where it is not possible to modify the radio software or hardware to send the TDD timing as described above, the TDMoIP converter may accomplish the same objective in the following manner. Each TDMoIP box sends, to its associated radio, timing packets at a rate that is about two times (but not exactly two times) the TDD frame rate. The TDMoIP box at the far end examines the apparent receipt time of each of these packets and notes that about ½ of the packets (usually but not always every other packet) arrive at times that are separated by a time difference that is very constant; this is the TDD frame time. This situation occurs when the timing packet from the other TDMoIP box is transmitted to the radio while that radio is operating in the receive (not the transmit) direction. The packet is then queued by the radio for transmission as soon as the radio goes into the transmit direction by virtue of the packet's high priority. A comb filter in the TDMoIP converter can then separate the regularly-arriving packets from the irregular ones, and perform the same computation described above.

With another aspect of the invention, one can build a simple RF field strength meter and place the RF field strength meter physically close to the antenna at each end of the communications path. The output of that circuit is converted to a logical 0 or 1 and sent to the TDMoIP converter, where the converted output is used in a similar way as the information in the first alternative.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A transmitter sending a data packet to a receiver through an Ethernet system, comprising:
    a clock recovery module that recovers an inherent clocking information from a signal obtained from the Ethernet system;
    a modeling module that constructs a modeled jitter buffer corresponding to the receiver without using knowledge of a current state of a receiver jitter buffer located at the receiver through a communication channel having a delay variation; and
    a packetizing buffer that collects data to form the data packet, that inserts a modeled receiver buffer pointer into the data packet, the modeled receiver buffer pointer being determined from the modeled jitter buffer, and that sends the data packet through the Ethernet system, wherein the packetizing buffer generates the modeled receiver buffer pointer so that the data packet begins at a midpoint of a preceding data packet and wherein at least two copies of each bit of the data packet are transmitted.

2. The transmitter of claim 1, the packetizing buffer repeating a data bit that is contained in the data packet in a succeeding data packet for supporting forward error correction (FEC).

3. The transmitter of claim 2, the succeeding data packet starting at a midpoint of the data packet, wherein the data packet precedes the succeeding data packet and wherein at least two copies of each bit of the data packet are transmitted.

4. The transmitter of claim 1, the modeling module determining statistical information descriptive of traffic performance in the Ethernet system and incorporating the statistical information into the modeled jitter buffer.

5. The transmitter of claim 1, the modeling module processing the statistical information to obtain a link delay variation of the Ethernet system.

6. The transmitter of claim 1, wherein the Ethernet system supports a Time Division Multiplex over Internet Protocol (TDMoIP) with a Time-Division-Duplex (TDD) format.

7. A receiver receiving a data packet from a transmitter through an Ethernet system, comprising:
    an Ethernet interface module that obtains the data packet from the Ethernet system;
    a jitter buffer; and
    a depacketizer that reads a buffer pointer in the data packet, the buffer pointer being indicative of a modeled jitter, and that places the data packet into a position of the jitter buffer in accordance with the buffer pointer, wherein:
        the modeled jitter is modeled for the receiver that is kept by a transmitter that transmits the data packet;

the buffer pointer is generated by the transmitter so that the data packet begins at a midpoint of a preceding data packet; and at least two copies of each bit of the data packet are transmitted.

8. The receiver of claim 7, further comprising:
a jitter buffer size register that is indicative of a size of the jitter buffer.

9. The receiver of claim 7, further comprising:
a read pointer register that is indicative of a next portion of data to be converted.

10. The receiver of claim 7, further comprising:
a level counter register that is indicative of an amount of received data since a system reset.

11. The receiver of claim 7, wherein the Ethernet system supports a Time Division Multiplex over Internet Protocol (TDMoIP) with a Time-Division-Duplex (TDD) format.

12. The receiver of claim 11, the transmitter sending an IP packet at a start of a TDD frame.

13. A transmission system comprising:
a transmitter sending a data packet to a receiver through an Ethernet system, the transmitter comprising:
a clock recovery module that recovers an inherent clocking information from a signal obtained from the Ethernet system;
a modeling module that constructs a modeled jitter buffer corresponding to a receiver without using knowledge of a current state of a receiver jitter buffer located at the receiver through a communication channel having a delay variation; and
a packetizing buffer that collects data to form the data packet, inserts a modeled receiver buffer pointer into the data packet, wherein the modeled receiver buffer pointer is determined from the modeled jitter buffer, sends the data packet through the Ethernet system, generates the modeled receiver buffer pointer so that the data packet begins at a midpoint of a preceding data packet, and transmits at least two copies of each bit of the data packet; and
the receiver configured to receive the data packet from the transmitter through the Ethernet system, the receiver comprising:
an Ethernet interface module that obtains the data packet from the Ethernet system;
the receiver jitter buffer; and a depacketizer that reads the modeled receiver buffer pointer in the data packet, the modeled receiver buffer pointer being indicative of a modeled jitter, and that places the data packet into a position of the receiver jitter buffer in accordance with the modeled receiver buffer pointer.

14. The transmission system of claim 13, the modeling module determining statistical information descriptive of traffic performance in the Ethernet system and incorporating the statistical information into the modeled jitter buffer.

15. The transmission system of claim 13, the modeling module processing the statistical information to obtain a link delay variation of the Ethernet system.

16. The transmission system of claim 13, wherein the Ethernet system utilizes wireless Ethernet communications.

17. The transmission system of claim 13 wherein the Ethernet system utilizes wired Ethernet communications.

18. The transmission system of claim 13, wherein the Ethernet system supports a Time Division Multiplex over Internet Protocol (TDMoIP) with a Time-Division-Duplex (TDD) format.

19. The transmission system of claim 18, the transmitter sending an IP packet at a start of a TDD frame to the receiver.

20. The transmission system of claim 18, the transmitter sending a sequence of timing packets at about two times a TDD frame rate.

21. A transmitter sending a current data packet to a receiver through an Ethernet system, comprising:
a clock recovery module recovering an inherent clocking information from a signal obtained from the Ethernet system;
a modeling module that constructs a modeled jitter buffer corresponding to the receiver without using knowledge of a current state of a receiver jitter buffer located at the receiver; and
a packetizing buffer collecting packet data to form the current data packet, determining a modeled buffer pointer from the modeled jitter buffer so that the current data packet begins with a subset of data contained within a preceding data packet, inserting the modeled receiver buffer pointer into the current data packet, and sending the current data packet through the Ethernet system, wherein at least two copies of each bit of the current data packet are transmitted.

* * * * *